United States Patent
Hoppe

(10) Patent No.: US 7,928,611 B2
(45) Date of Patent: Apr. 19, 2011

(54) ELECTRIC MOTOR WITH A MEASUREMENT SYSTEM FOR POSITION OR MOVEMENT

(75) Inventor: Thomas Hoppe, Lemgo (DE)

(73) Assignee: Siemens Aktiengesellschaft, München (DE)

( * ) Notice: Subject to any disclaimer, the term of this patent is extended or adjusted under 35 U.S.C. 154(b) by 159 days.

(21) Appl. No.: 12/377,741

(22) PCT Filed: Aug. 9, 2007

(86) PCT No.: PCT/EP2007/058272
§ 371 (c)(1),
(2), (4) Date: Feb. 17, 2009

(87) PCT Pub. No.: WO2008/019988
PCT Pub. Date: Feb. 21, 2008

(65) Prior Publication Data
US 2010/0231058 A1    Sep. 16, 2010

(30) Foreign Application Priority Data

Aug. 16, 2006 (DE) .......................... 10 2006 038 162

(51) Int. Cl.
*H02K 41/02* (2006.01)
(52) U.S. Cl. ................... 310/12.19; 310/12.18
(58) Field of Classification Search .... 310/12.18–12.19, 310/12.24–12.26; 318/135
See application file for complete search history.

(56) References Cited

U.S. PATENT DOCUMENTS

| | | | |
|---|---|---|---|
| 4,024,458 A | | 5/1977 | Templin |
| 4,733,177 A | | 3/1988 | Pawletko |
| 5,179,304 A | * | 1/1993 | Kenjo et al. ................. 310/12.27 |
| 5,801,462 A | * | 9/1998 | Yagoto et al. .............. 310/12.19 |
| 5,880,541 A | * | 3/1999 | Hinds et al. ................. 310/12.19 |
| 5,973,459 A | * | 10/1999 | Itoh ................................ 318/135 |
| 6,476,524 B1 | * | 11/2002 | Miyamoto et al. .......... 310/12.19 |
| 7,262,523 B1 | * | 8/2007 | Faizullabhoy et al. ..... 310/12.19 |
| 7,746,064 B2 | * | 6/2010 | Knorr et al. .................... 324/174 |
| 2002/0047315 A1 | * | 4/2002 | Chitayat ......................... 310/12 |
| 2003/0048011 A1 | * | 3/2003 | Kashkarov et al. ............. 310/12 |

(Continued)

FOREIGN PATENT DOCUMENTS

DE     27 39 877 A1     11/1978

(Continued)

*Primary Examiner* — Thanh Lam
(74) *Attorney, Agent, or Firm* — Henry M. Feiereisen; Ursula B. Day

(57) ABSTRACT

An electric motor with a magnet free main drive component, as stator or secondary part, having a measuring system for determining positions and directions with increased resolution is proposed. Said electric motor comprises a first engine part (140), being moveable in relation to a second engine part (110). A number of magnetic field sensor devices (160) of the measuring system are attached on the first engine part (140), being separated from each other along the direction of movement. The second engine part (110) comprises magnet free pole-teeth (120), being also separated from each other along the direction of movement. Each of the magnetic field sensor devices (160) has at least one magnet, the magnetic field thereof being directed through one of the pole-teeth (120) for detection by a sensor of the magnetic field sensor device. The space between each two of the magnetic field sensor device (160) is different to the space between each two of the pole-teeth (120). Thus, refined determination of the position, for example with a synchronous linear motor with permanent magnet free secondary part can be achieved.

5 Claims, 5 Drawing Sheets

U.S. PATENT DOCUMENTS

2006/0001390 A1 * 1/2006 Yamazaki et al. ............ 318/135
2008/0265689 A1 * 10/2008 Arneit et al. ................... 310/12

FOREIGN PATENT DOCUMENTS

| | | | |
|---|---|---|---|
| DE | 29 49 260 | A1 | 6/1981 |
| DE | 31 47 819 | A1 | 6/1983 |
| DE | 690 21 240 | T2 | 4/1996 |
| DE | 100 07 011 | A1 | 8/2001 |
| DE | 101 03 478 | A1 | 8/2001 |
| DE | 100 24 850 | A1 | 11/2001 |
| DE | 101 35 541 | B4 | 4/2004 |
| EP | 0 467 202 | A | 1/1992 |

* cited by examiner

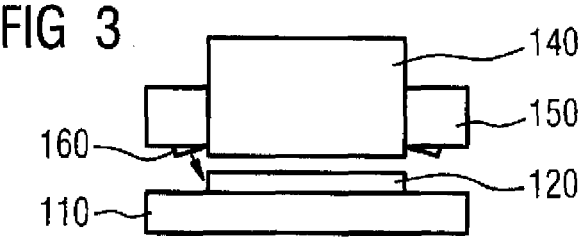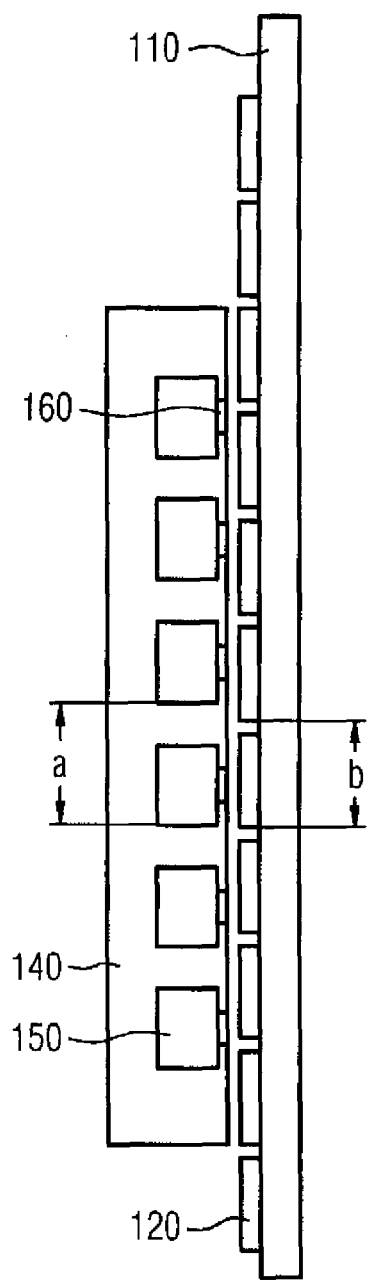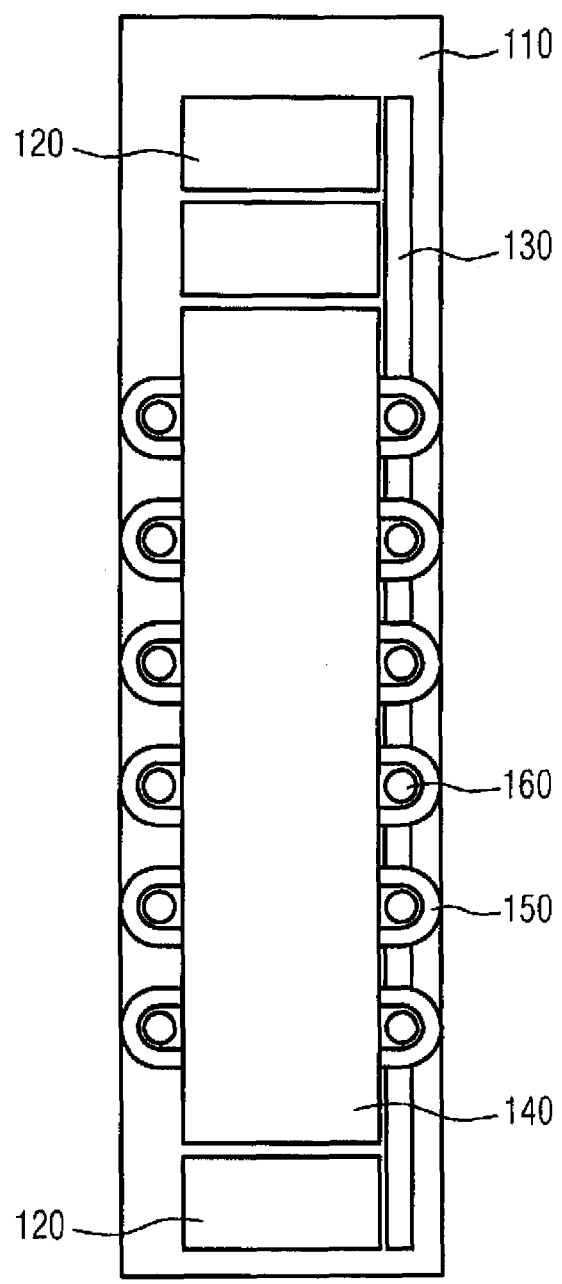

ELECTRIC MOTOR WITH A MEASUREMENT SYSTEM FOR POSITION OR MOVEMENT

BACKGROUND OF THE INVENTION

The invention relates to an electric motor having a measurement system for determination of the position or movement of a first motor part which can move with respect to a second motor part, wherein the second motor part has a number of magnetic field sensor devices which are separated from one another along the movement direction.

The electric motors may be linear or rotary motors.

Known measurement systems have the common feature that discrete position indicators are arranged at uniform intervals in the movement direction in which the position is to be determined, and are read by a single read head. In the event of a movement, the position can be determined by suitable evaluation of the read signal, for example by incremental logic. The accuracy of the position determination is in this case governed by the distance between the position indicators.

Because of the spatial extent of the position indicators in the movement direction, these distances cannot be reduced indefinitely, however, and, furthermore, the manufacturing effort is increased for measurement systems with miniaturized distances.

SUMMARY OF THE INVENTION

The invention is based on the object of specifying an electric motor which has a main drive component such as a stator or secondary part without any magnets, with a measurement system for position determination, in which the measurement accuracy is increased without changing the distance between the position indicators, or greater distances may be permitted between the position indicators, for the same measurement accuracy.

The object is achieved in accordance with the invention by an electric motor having a measurement system for determination of the position or movement of a first motor part which can move with respect to a second motor part, wherein a number of magnetic field sensor devices of the measurement system are attached to the first motor part and are separated from one another along the movement direction, wherein the second motor part has pole teeth without magnets, which are separated from one another along the movement direction, each of the magnetic field sensor devices has at least one magnet whose magnetic field is passed through one of the pole teeth for detection by means of a sensor of the magnetic field sensor devices, and the distance between in each case two of the magnetic field sensor devices is different to the distance between in each case two of the pole teeth.

The invention therefore makes use of the nonius principle. For example, if the distance between two indicators (in this case: pole teeth) is $\Delta$, this governs the resolution of a conventional measurement system. In order to achieve a resolution of $D=\Delta/N$ (N is an integer) according to the invention, N receptors (in this case: sensors) separated by a distance 8 are used, where $\delta$ is given by $\delta=\Delta-D$.

Thus, if one of the receptors in a specific position identifies a position indicator, the receptor which follows this in the movement direction detects the next position indicator following this after a movement through the distance D, as a result of which the overall resolution is increased to D.

In principle, it is also possible to select the distances between the receptors to be greater than the distances between the indicators, in which case the resolution D is given by the difference between the distances. This also means that the ratio of the distance between the indicators and the distance between the receptors should not be an integer since, in this case, only the original resolution $\Delta$ is achieved. For this reason, the ratio of the distance between the magnetic field sensor devices and the distance between the pole teeth should also not be an integer.

Furthermore, it is advantageous for the pole teeth to be at the same distances from one another, and likewise for the magnetic field sensor devices to be at the same distances from one another. However, the distances may also be different in individual movement sections. This allows a high resolution to be obtained in desired movement sections, and a less high resolution to be obtained in other movement sections, while the distances between the individual sections are the same.

Corresponding to one preferred embodiment, the magnetic field sensor device has a U-shaped yoke section, and the sensor is arranged in/on the yoke section, wherein two magnets which are directed or can be directed in opposite directions are arranged at a free end of the yoke section in order to produce magnetic fluxes, which are directed in opposite directions and can be detected by the sensor, in the yoke section as a function of the position of the magnets with respect to one of the pole teeth of the first motor part. This changes the ratio of the magnetic fluxes in the two magnet coils at one of the free ends of the yoke. As mentioned, because the voltages in the sensor elements are in different directions, a correspondingly precise position signal can be obtained, possibly with zero crossing.

Two magnets, which are directed or can be directed in opposite directions, are preferably arranged at each of the two free ends of the U-shaped yoke section. This correspondingly increases the magnetic flux in the yoke.

A further preferred embodiment of the electric motor according to the invention consists in that the magnetic field sensor device has a U-shaped yoke section, the magnet is arranged in or on the yoke section, and the sensor is likewise mounted in/on the yoke section, wherein the sensor has two sensor elements at a free end of the yoke section, which sensor elements emit voltages in different directions when the magnetic flux through the yoke section is the same, such that correspondingly high and directed voltages can be tapped off on the sensor elements as a function of the position of the sensor elements with respect to one of the pole teeth. This has the advantage, which has likewise already been mentioned, that the ratio of the magnetic fluxes in the two magnet coils changes at one of the free ends of the yoke. Because the voltages in the sensor elements are in different directions, a correspondingly precise position signal can be obtained, possibly with zero crossing.

In another refinement of the invention, the magnetic field sensor device may have an E-shaped yoke which is split into two yoke parts symmetrically and transversely with respect to the movement direction, the sensor can be arranged between the two yoke parts, and the magnet can be located at the ends of both yoke parts. Even with a single magnet, this design makes it possible to ensure that the direction of the magnetic flux in the yoke changes within the yoke or yoke section when the transmitter apparatus moves. In this case, the measurement then includes only a single magnet tolerance.

The electric motor is preferably in the form of a linear motor, wherein the first motor part is the secondary part and the second motor part is the primary part. A synchronous linear motor with a secondary part without permanent magnets can thus be equipped with the high-resolution measurement system according to the invention.

BRIEF DESCRIPTION OF THE DRAWING

The present invention will now be explained in more detail with reference to the attached drawings, in which:

FIGS. 1 to 3 show various schematic views of a linear motor according to the invention with a secondary part without permanent magnets;

DETAILED DESCRIPTION OF PREFERRED EMBODIMENTS

The exemplary embodiments which will be described in more detail in the following text represent preferred embodiments of the present invention. The exemplary embodiments relate to linear motors, although they may also be transferred in the same sense to rotary motors, in particular torque motors.

Figure 4:
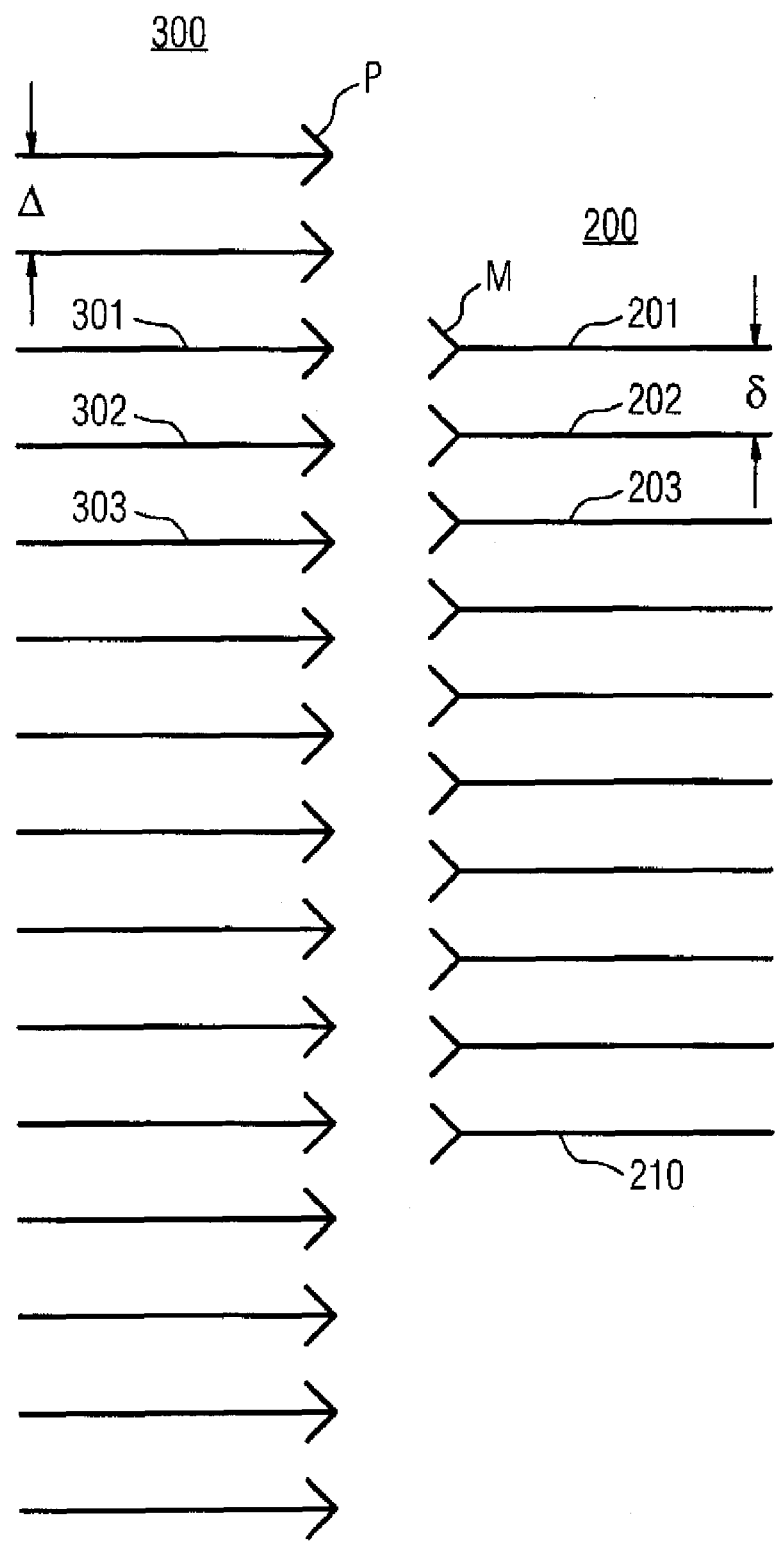
FIG. 4 shows a schematic illustration in order to explain the measurement principle.

FIG. 4 shows, symbolically, a linear arrangement 300 of individual magnetic pole teeth 301, 302 . . . , which are each separated by a distance Δ, in this case for example 10 units (for example mm). The arrangement 300 may extend over any desired lengths in which a position determination is to be carried out (vertically in FIG. 4).

An arrangement 200 of magnetic field sensor devices 201, 202, . . . , 210 is arranged parallel to the arrangement 300 of magnetic pole teeth. The magnetic field sensor devices are separated by a distance δ which, in the illustrated example, is 9 units (for example mm).

In the illustrated position, the magnetic field sensor device 201 is directly opposite the pole tooth 301, as a result of which the magnetic field sensor device 201 detects the pole tooth 301.

If the scanning arrangement 200 is moved through a distance D=Δ−δ in the movement direction (vertically downwards in FIG. 4), then the magnetic field sensor device 202 is opposite the pole tooth 302 and detects it. This process continues on further movement through D in each case, until the magnetic field sensor device 210 detects a pole tooth. The magnetic field sensor device 201 is then opposite the pole tooth 302, and the process starts again. Suitable evaluation of the signals from the magnetic field sensor devices, for example incremental valuation, results in a total of 10 signals between the position illustrated in FIG. 4 and the position in which the magnetic field sensor device 201 is opposite the pole tooth 302. The resolution of the measurement system is therefore improved by a factor Δ/(Δ−δ).

The arrangements 300 and 200 can also be positioned such that the pole teeth P and the magnetic field sensor devices M lie on concentric circles. This makes it possible to determine rotation positions in the case of rotary motors.

The measurement system according to the invention will be explained in the following text with reference to a linear electric motor.

The linear electric motor illustrated in FIGS. 1 to 3 has, in a manner which is known per se, a secondary part with a mounting plate 110 and pole teeth 120 which are fitted thereon and are arranged linearly adjacent to one another, without any permanent magnets. The secondary part interacts across an air gap with a primary part which has a body 140 and windings 150 held therein, as well as permanent magnets which are not illustrated. In this case, the pole pitch a of the windings 150 of the primary part is not the same as the distances b between the pole teeth 120 without magnets, of the secondary part.

According to the invention, the primary part is provided with a plurality of magnetic field sensor devices 160. Each magnetic field sensor device has at least one magnet and at least one magnetic field sensor (cf. FIGS. 5 to 11). The magnetic field sensor devices 160 are arranged in the coils 150 and are directed at the pole teeth 120, as is illustrated by the arrow in FIG. 3.

Since the pole pitch a of the windings is not the same as the distances b between the pole teeth, without magnets, of the secondary part, the individual magnetic field sensor devices 160 detect magnetic fields of their respective permanent magnets locally in different phases. The position can be determined, or the accuracy can be considerably increased, by suitable evaluation of these signals ("nonius principle").

Although two magnetic field sensor devices 160 are provided for each coil in the figures, in principle, however, one magnetic field sensor device per coil is sufficient. It is also possible to place the magnet of one magnetic field sensor device on one side of the primary part, and its magnetic field sensor on the other side.

FIG. 2 furthermore shows a magnet track 130 which is fitted at the side, alongside the row of pole teeth 120, on the mount 110 of the secondary part. This magnet track 130 may, for example, be composed of rubber or plastic that can be magnetized, and is fixed on the mount 110.

Information relating, for example, to the position is coded in the magnet track as an absolute value or increment value and/or for commutation, and this information is read from the magnet track by a single read head (not illustrated).

In the illustrated exemplary embodiment, the resolution of the measurement system results from the distance between the pole teeth b (Δ), which represent the position indicators, and the pole pitch a (δ) between the magnetic field sensor devices, which represent the receptors, as:

$$D = a - b.$$

A number of embodiments of magnetic field sensor devices which can be used in the electric motor according to the invention will be explained in more detail in the following text in conjunction with FIGS. 5 to 11.

Figure 5:
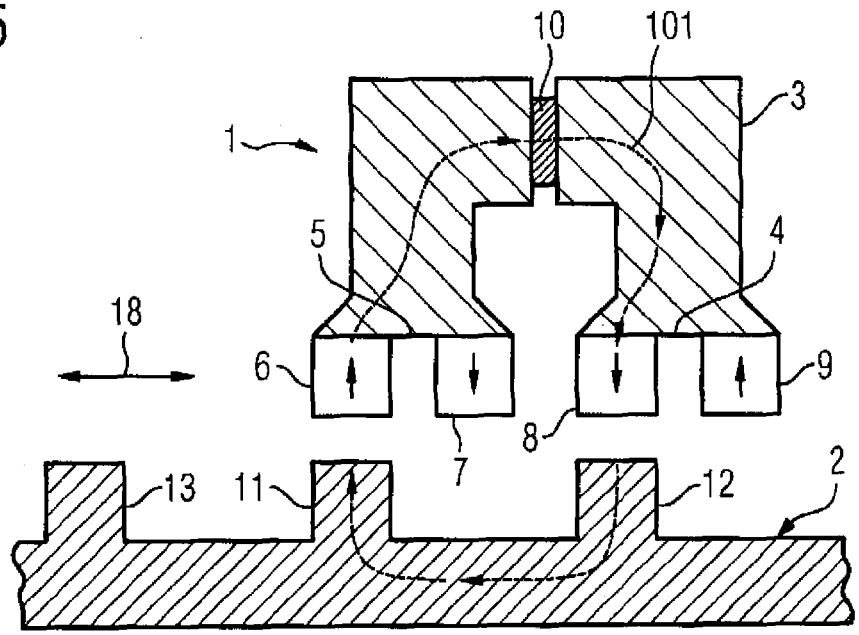
FIG. 5 shows a longitudinal section through a magnetic field sensor device or transmitter apparatus according to a first embodiment.

The longitudinal section, as shown in FIG. 5, of a part of a linear motor shows a scanning head 1 and a section of a primary part, and a secondary part 2. The scanning head 1 is in this case used as a magnetic field sensor device. A plurality of such magnetic field sensor devices are arranged in the movement direction on the primary part of the motor, as is indicated in FIGS. 1 and 2. The primary part 1 has a yoke 3 which is essentially U-shaped. Permanent magnets 6, 7, 8 and 9 are arranged as pole teeth at the free ends 4 and 5 on the yoke 3. All of the permanent magnets 6 to 9 are magnetized in the direction from the scanning head 1 to the secondary part 2, or vice versa. Two permanent magnets 6, 7 and 8, 9 are respectively located at each of the free ends 4, 5 and are magnetized parallel, but in opposite directions.

A Hall sensor 10 is located in the yoke 3, between the two free ends 4 and 5. The Hall sensor 10 may split the yoke 3 into two halves.

In this case, the secondary part 2 comprises a toothed rod with the teeth 11, 12 and 13. The teeth of the secondary part 2 are at the same distance apart as the teeth 6 and 8, as well as 7 and 9, of the scanning head 1.

The yoke 3 and the secondary part 2 are composed of a ferromagnetic material. They are preferably laminated.

In the position illustrated in FIG. 5, in which the permanent magnets 6 and 8 of the primary part are above the teeth 11 and 12 of the secondary part 2, a magnetic field or magnetic flux 101 passes "from left to right" through the Hall sensor 10. If the scanning head 1, that is to say the magnetic field sensor device, is now moved further to the left in the movement direction 18, then the magnetic field through the Hall sensor 10 decreases ever further until it becomes zero. As the movement continues, the direction of the magnetic field changes and it finally assumes a maximum value. This is the case when the scanning head is positioned such that the permanent magnets 7 and 9 are above the teeth 11 and 12 of the secondary part. On further movement to the left, the magnetic field falls again, changes direction and finally assumes a maximum value again, when the permanent magnets 6 and 8 are above the teeth 13 and 11. The process therefore passes through one and only one transmitter signal period with zero crossings during this movement for one tooth pitch.

Figure 6:
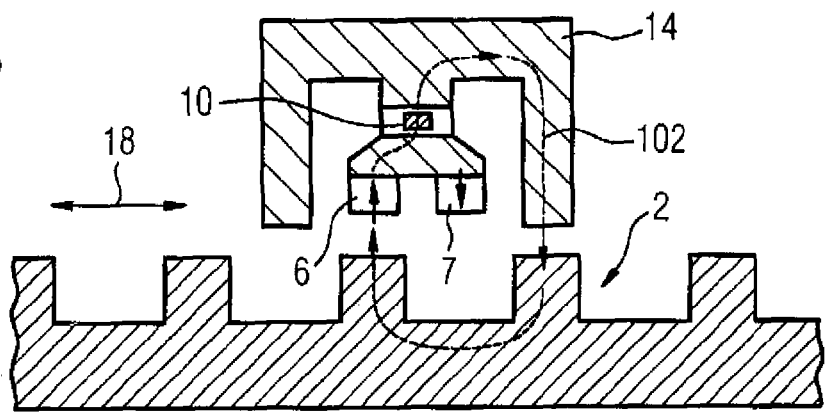
FIG. 6 shows a longitudinal section through a magnetic field sensor device according to a second embodiment, with an E-shaped yoke.

FIG. 6 shows a modified embodiment of the magnetic field sensor device in contrast to the exemplary embodiment shown in FIG. 5. A plurality of modification steps have been carried out for the modification, and these can also be carried out individually or in combinations of two.

The first modification step is to arrange permanent magnets 6, 7 at only a single free end of the yoke. Since the permanent magnet 6 produces a magnetic field which is directed upwards in FIG. 6 and is arranged above a pole tooth of the secondary part 2, this results in the flux 102 as shown through the Hall sensor 10. If, in contrast, the permanent magnet 7, whose magnetization is directed downwards, is located above a pole tooth of the secondary part 2, then the magnetic flux is directed through the Hall sensor 10 in the opposite direction.

A second modification step consists in that the Hall sensor is not arranged in the connecting limb between the two free end limbs of the U-shaped yoke but in one of the limbs which ends free.

A third modification step consists in that a third limb which ends free is attached to the yoke. In the example shown in FIG. 6, this thus results in an integral, E-shaped yoke 14. The flux which governs the determination of movement or position essentially passes, however, only through a U-shaped yoke section unless the position sensor is located in a symmetrical position with respect to the pole teeth of the secondary part 2.

Figure 7:
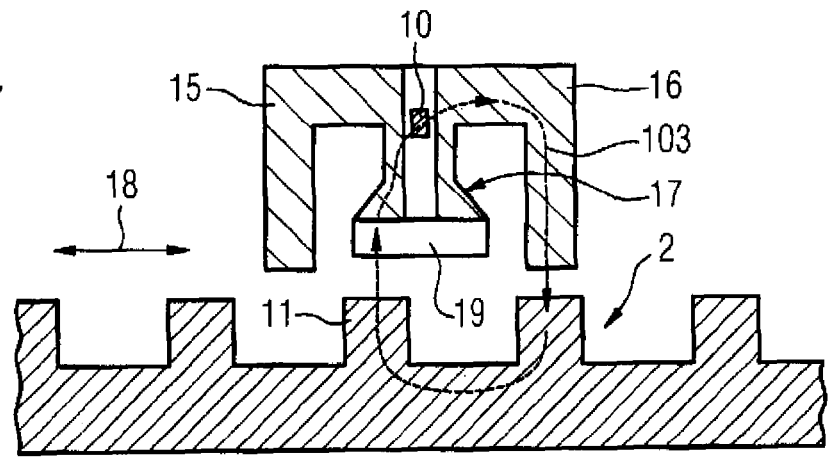
FIG. 7 shows a longitudinal section through a magnetic field sensor device according to a third embodiment, with a single permanent magnet.

FIG. 7 shows a further embodiment of the magnetic field sensor device with an E-shaped yoke. The yoke is split symmetrically into two yoke halves 15 and 16, between which an air gap is located, in which the Hall sensor 10 is arranged. The center limb 17 therefore comprises two parallel limb halves which are separated by the air gap in which the Hall sensor 10 is located. A single permanent magnet 19 is located at the free end of the two limb halves. In the example shown in FIG. 7, this permanent magnet 19 is magnetized upwards, thus resulting in the flux 103 as shown. Since the left-hand half of the limb 17 is located above the pole tooth 11 on the secondary part 2, the magnetic flux in the left-hand limb half runs upwards and from left to right through the Hall sensor 10. When the right-hand half of the center limb 17 is located above the pole tooth 11 or another pole tooth, the magnetic flux runs essentially in the right-hand half, and passes through the Hall sensor 10 from right to left. This results in a measurement voltage with the opposite mathematical sign. The advantage of this embodiment is that only one permanent magnet need be provided for the magnetic field sensor device.

Figure 8:
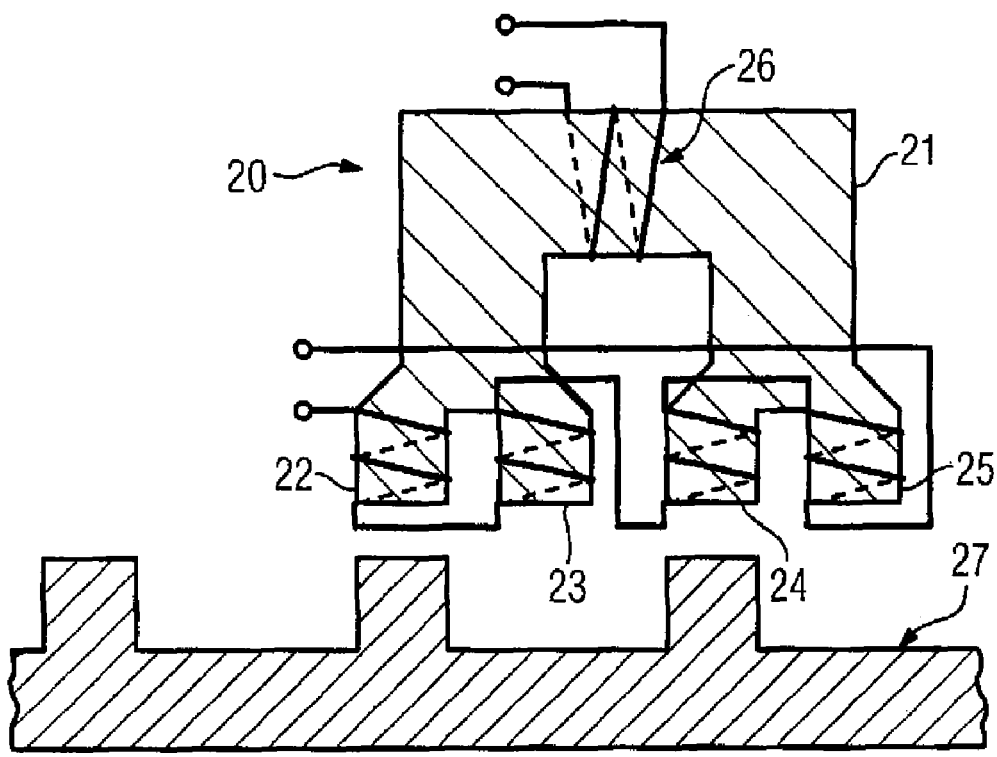
FIG. 8 shows a longitudinal section through a magnetic field sensor device according to a fourth embodiment.

The measurement principle can also be transferred to an inductive measurement head based on the reluctance resolver principle, by replacing the permanent magnets and the Hall sensor by corresponding coils. Accordingly, as shown in FIG. 8, the alternative magnetic field sensor device, that is to say the transmitter apparatus 20, is provided with field coils 22, 23, 24, 25 at the free ends of its yoke 21. Since the electromagnets that are formed in this way must have different magnetization directions at the free ends of the yoke 21, they are appropriately electrically connected. In the present example, the field coils 22 to 25 are connected in series. In order to achieve the opposite magnetization directions, these coils 22 to 25, with the same winding senses, are connected in series such that the lower connection of the coil 22 is connected to the lower connection of the coil 23, the upper connection of the coil 23 is connected to the lower connection of the coil 24, and the upper connection of the coil 24 is connected to the upper connection of the coil 25. A field signal is applied to the upper connection (which is thus still free) of the coil 22, and to the lower connection (which is thus still free) of the coil 25.

A measurement coil 26 is wound around the connecting limb which connects the two limbs to the free ends of the yoke 21. A voltage which is produced by the magnetic flux flowing in the yoke 21 can be tapped off on this measurement coil 26.

The secondary part 27 of the linear drive has the same form as that of the secondary part 2 in FIG. 5. The geometry of the primary part and of the transmitter apparatus 20 is likewise the same as that of the part 1 in FIG. 5.

In principle, the method of operation of the transmitter apparatus shown in FIG. 8 corresponds to that of the apparatus shown in FIG. 5. In this case, the permanent magnets are simply replaced by field coils, and the Hall sensor by a measurement coil. Since the electromagnets 22 to 25 are operated with alternating current, the equivalence with the exemplary embodiment as described above and as shown in FIG. 5 applies only in correspondingly short time windows. This means that, in this short time window, the direction of the magnetic flux in the yoke depends directly on the position of the magnet coils with respect to the pole teeth of the machine component.

The coils which are used in the exemplary embodiment shown in FIG. 6 can also be operated with the opposite function. The coil 26 can thus be used as a field coil, and the coils 22 to 25 at the free ends of the yoke 21 as measurement coils. In this case, the measurement signals from the individual coils are added to form a resultant measurement signal. This once again reaches its maximum values when the teeth are located above those on the secondary part 27. In between, there are zero crossings as in the exemplary embodiment shown in FIG. 5.

As has been indicated above, it is possible to transfer from an arrangement with Hall sensors and permanent magnets to an arrangement based on the reluctance resolver principle.

Measurement coils and field coils can likewise be interchanged with one another.

Figure 9:
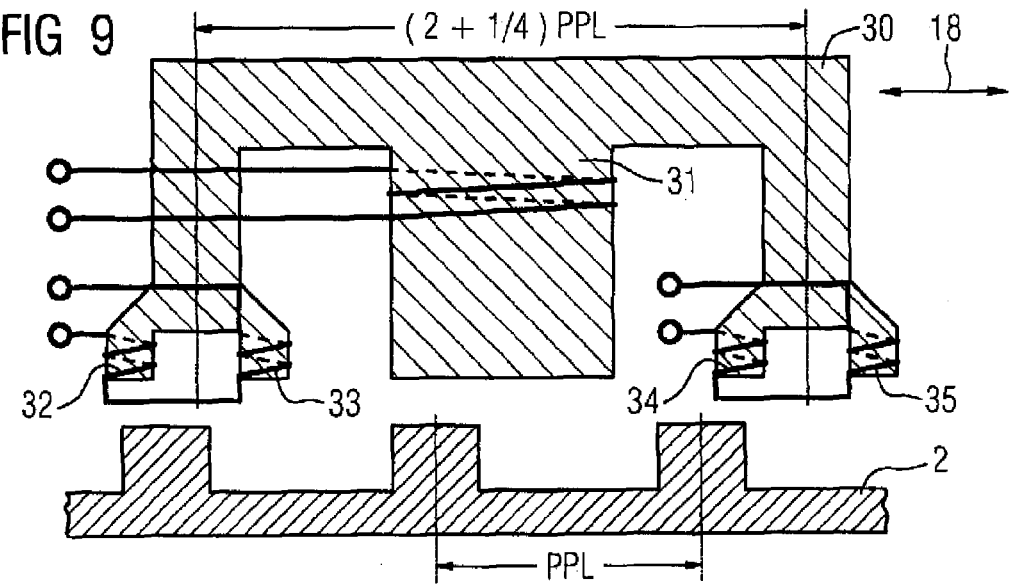
FIG. 9 shows a longitudinal section through a fifth embodiment of a magnetic field sensor device.

FIG. 9 illustrates a further exemplary embodiment of a magnetic field sensor device according to the invention. With this magnetic field sensor device or transmitter apparatus, it is possible to generate not only one but two signals, phase-shifted through 90°, and each with a zero crossing. For this purpose, a field coil 31 is wound around the center limb of an E-shaped yoke 30. Two measurement coils 32, 33 are located at the free end of the left-hand limb of the yoke 30, in order to produce a cosine signal. In the same way, two measurement coils 34 and 35 are located at the end of the right-hand limb of the yoke 30 in order to produce a sine signal. The measurement coils 32 and 33 are connected in series with the same winding sense such that the lower connections of the two coils are connected. This also applies to the measurement coils 34 and 35.

In order to optimize the measurement signals, the size of the yoke 30 is matched to the pole pair length PPL and electrical period of the secondary part 2. The distance between the centers of the outer limbs of the yoke 30 is accordingly 2.25 PPL. A sine signal and a cosine signal, each with a zero crossing, can thus be obtained for position determination, using a single head.

Figure 10:
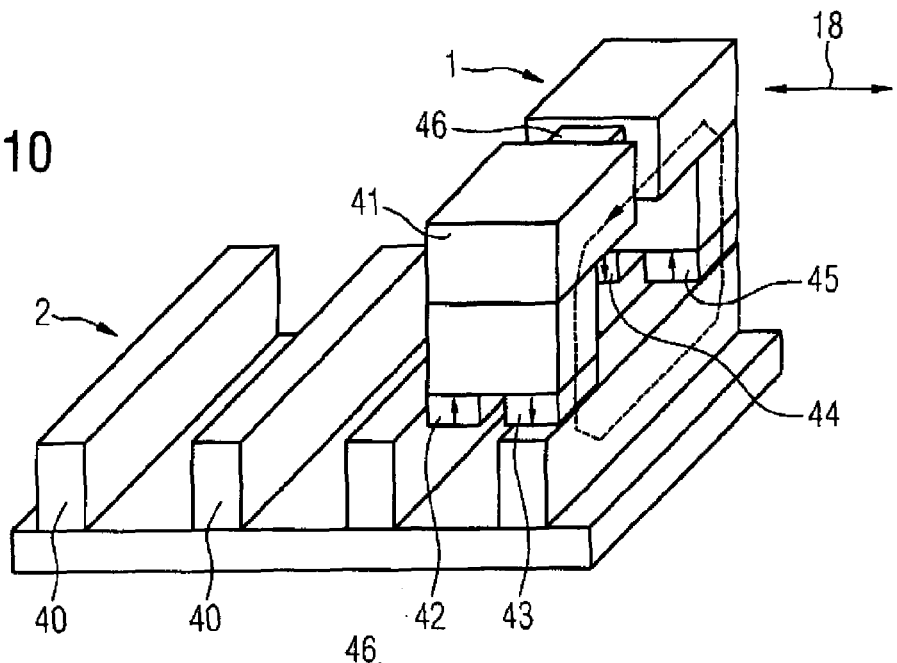
FIG. 10 shows a 3D view of a sixth embodiment.
Figure 11:
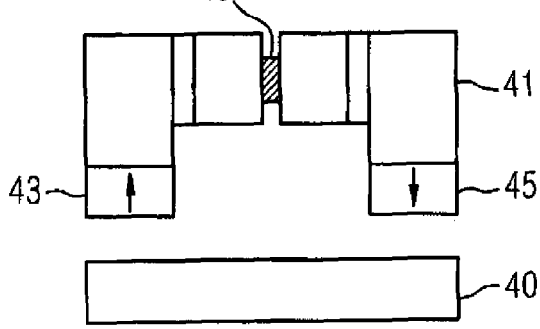
FIG. 11 shows a front view of the embodiment shown in FIG. 7.

The arrangements described in conjunction with FIGS. 5 to 9 are suitable for secondary parts of so-called longitudinal-flux machines, that is to say for machines in which the flux that is produced by the motor has its path closed in the secondary part in the movement direction. The secondary part of such longitudinal-flux machines is distinguished in that the individual teeth of the secondary part are connected to one another in a magnetically permeable form. In the case of lateral-flux machines, in contrast, in which the flux that is produced by the motor has its path closed transversely with respect to the movement direction and thus within one respective tooth, the teeth 40 need not in consequence be magnetically permeably connected to one another. FIG. 10 shows a plan view of an arrangement for a secondary part such as this composed of teeth 40 which are magnetically isolated from one another. FIG. 8 shows a corresponding front view. The yoke 41 or the yoke section is also essentially U-shaped in this case. Two permanent magnets 42, 43 and 44, 45 are located at each of the free ends of the yoke 41. The magnetization directions of the magnets 42 and 43 are likewise in opposite directions, in the same way as the magnetization directions of the magnets 44 and 45. A Hall sensor 46 in the center of the yoke 41 registers the magnetic flux. When the yoke 41 with its magnets moves in the movement direction 15 over the pole teeth 40 of the secondary part, then the flux direction through the Hall sensor 46 is also changed in this case.

The sinusoidal form of the sensor signal can be optimized by an appropriate configuration of the scanning head and of the transmitter apparatus 1, 20, and possibly of the secondary part 2, 27. In this case, not only the shape of the pole teeth but also the distance between them is significant.

In order to implement the measurement principle, it is sufficient for permanent magnets or coils to be arranged only at one free end of a yoke 3, 21. The other free end of the yoke 3, 21 need not necessarily also be fitted with magnets. However, the quality of the sensor signal is decreased in this embodiment.

The configuration according to the invention of the measurement system with a plurality of magnetic field sensor devices advantageously achieves higher resolution than the prior art.

What is claimed is:

1. An electric motor, comprising:
a first motor part;
a second motor part, with the first motor part moveable in relation to the second motor part in a movement direction, the second motor part having pole teeth in the absence of magnets and separated from one another along the movement direction; and
a measurement system determining a position or movement of the first motor part and including a plurality of magnetic field sensor devices which are attached to the first motor part and separated from one another along the movement direction, with neighboring magnetic field sensor devices being spaced apart by a distance which is different than a distance between neighboring pole teeth,
wherein each of the magnetic field sensor devices has at least one magnet whose magnetic field is passed through one of the pole teeth for detection by means of a sensor of the magnetic field sensor devices, and
wherein each of the magnetic field sensor devices includes a U-shaped yoke section having a free end face, with the sensor arranged in or on the yoke section, and with two magnets which are directed or directable in opposite directions, being arranged at the free end of the yoke section to produce magnetic fluxes, which are directed in opposite directions and detectable by the sensor in the yoke section as a function of the position of the magnets with respect to one of the pole teeth of the first motor part.

2. The electric motor of claim 1, wherein a ratio of the distance between the magnetic field sensor devices to the distance between the pole teeth is not an integer.

3. The electric motor of claim 1, wherein the pole teeth are arranged at same distances from one another, and the magnetic field sensor devices are arranged at same distances from one another.

4. The electric motor of claim 1, wherein two magnets of each magnet field sensor device are arranged at each of both ends of the yoke section.

5. The electric motor of claim 1, constructed in the form of a linear motor, with the first motor part representing a secondary part of the linear motor, and the second motor part representing a primary part of the linear motor.

\* \* \* \* \*